Dec. 5, 1933.    F. E. TERRILL    1,937,607
APPARATUS FOR REMOTE CONTROL OF PRIME MOVERS
Filed Aug. 26, 1930    3 Sheets-Sheet 1
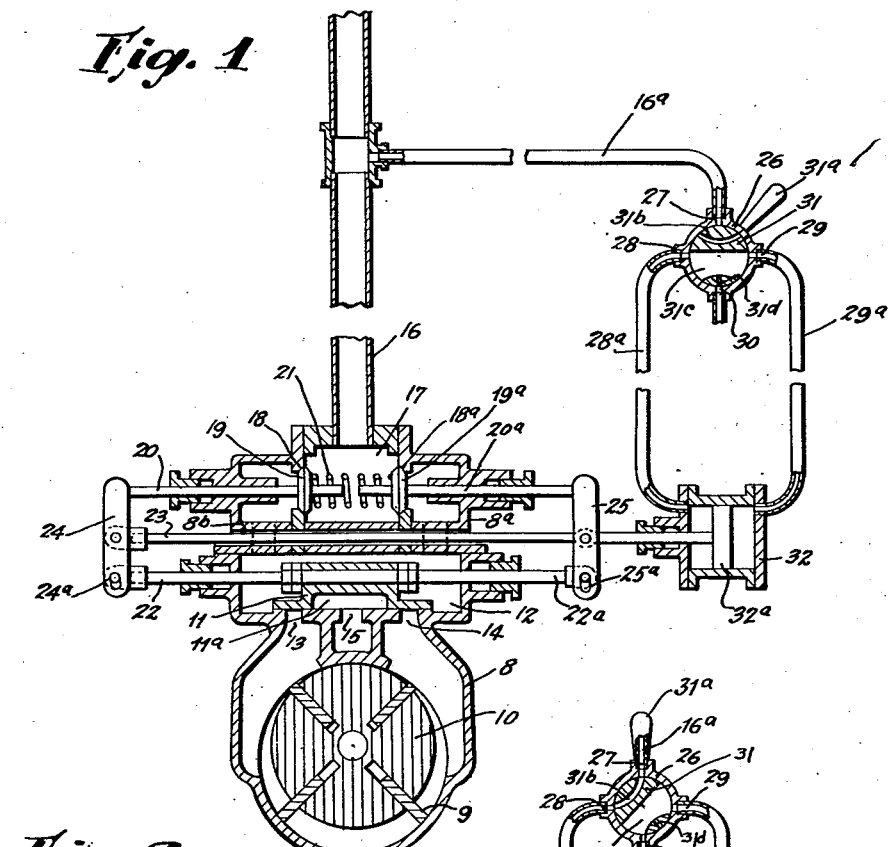
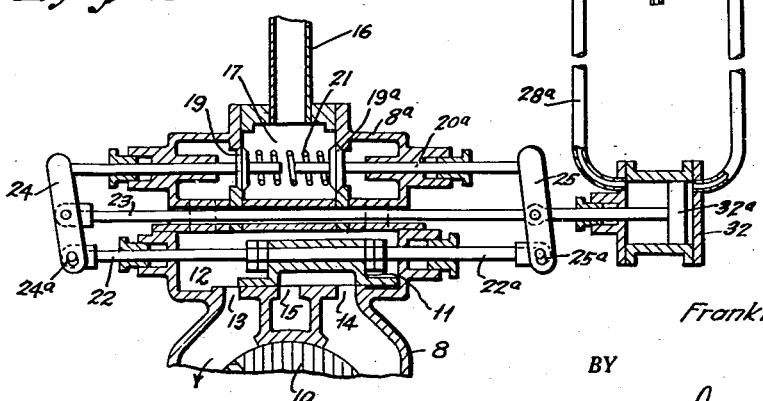
INVENTOR.
Franklin E. Terrill
BY
Ira L. Nickerson
ATTORNEY.

Dec. 5, 1933.  F. E. TERRILL  1,937,607
APPARATUS FOR REMOTE CONTROL OF PRIME MOVERS
Filed Aug. 26, 1930  3 Sheets-Sheet 2
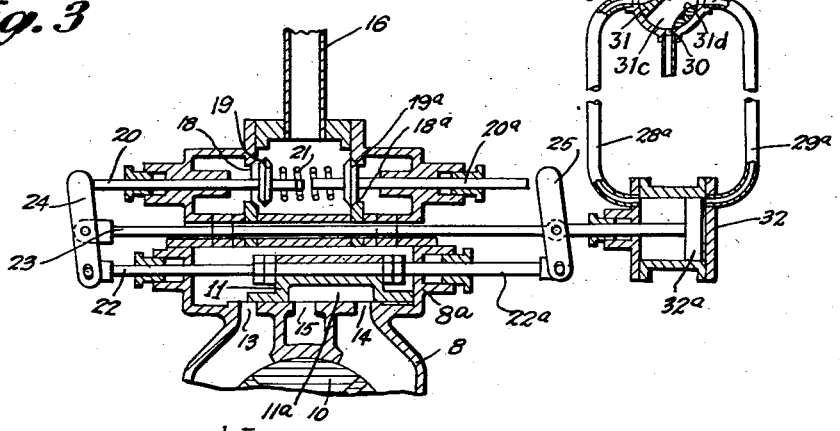
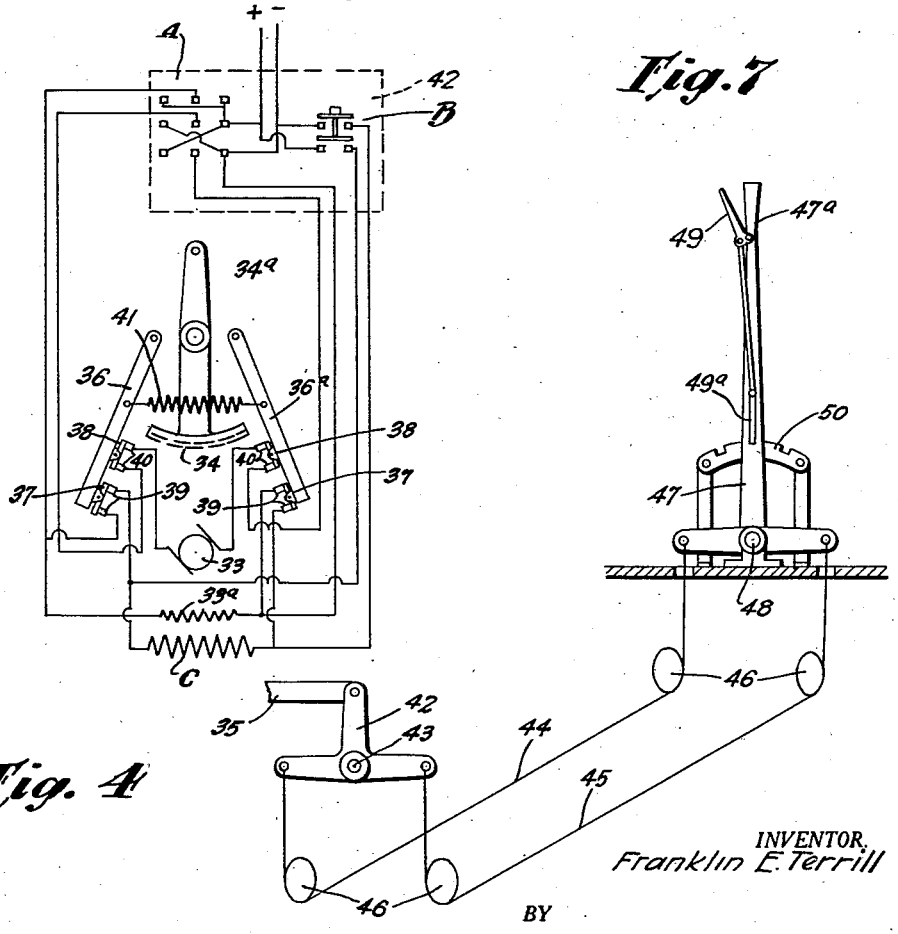
INVENTOR.
Franklin E. Terrill
BY
Ira L. Nickerson
ATTORNEY.

Dec. 5, 1933.   F. E. TERRILL   1,937,607
APPARATUS FOR REMOTE CONTROL OF PRIME MOVERS
Filed Aug. 26, 1930   3 Sheets-Sheet 3

INVENTOR.
Franklin E. Terrill
BY
Ira L. Nickerson
ATTORNEY.

Patented Dec. 5, 1933

1,937,607

UNITED STATES PATENT OFFICE 1,937,607

APPARATUS FOR REMOTE CONTROL OF PRIME MOVERS

Franklin E. Terrill, Cleveland, Ohio, assignor to Chicago Pneumatic Tool Company, New York, N. Y., a corporation of New Jersey Application August 26, 1930. Serial No. 477,861

8 Claims. (Cl. 121—138)

This invention relates to fluid pressure prime movers of the reversible type and more particularly to control mechanism therefor. It also concerns means for convenient operation of the control mechanism from a point remote from the prime mover.

One object of the invention is to improve the control mechanism for a reversible fluid pressure prime mover. Another object is to provide remote control apparatus which will secure full power from the prime mover. Another object is to provide control mechanism on the prime mover which is conveniently adaptable for actuation from a remote point by a choice of means such as fluid pressure, electrical, mechanical or manual. Other objects will be apparent from the detailed description which follows.

In order to illustrate the invention one concrete embodiment thereof is shown in the accompanying drawings with varied means for controlling the same from a remote point. In the drawings:

Fig. 1 is a sectional view through the prime mover and its control mechanism indicating other features of the invention rather diagrammatically, the operating parts being in neutral position and fluid pressure means being utilized to control the prime mover;

Fig. 2 is a detail sectional view of the parts shown in Fig. 1 but indicating changes in the position of certain of the same just before the movement of the control member is completed;

Fig. 3 is a similar detail sectional view showing the position of the parts at the end of the movement of the control member;

Fig. 4 is a combined diagrammatic illustration and wiring diagram of electrical means for controlling the prime mover;

Fig. 7 illustrates in side elevation and somewhat diagrammatically a manually operated remote control arrangement.

Figure 5:
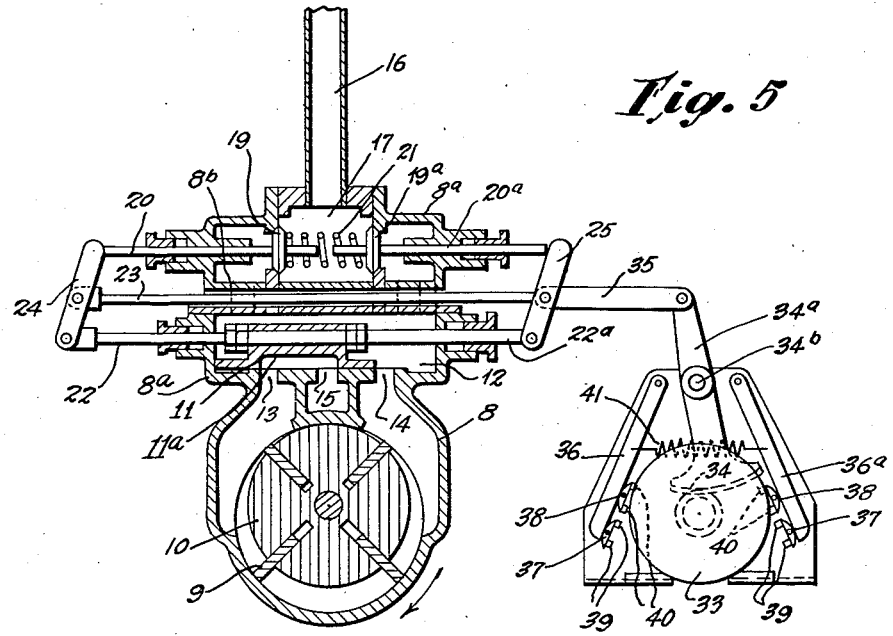
Fig. 5 is a sectional view of the prime mover indicating somewhat diagrammatically the arrangement for electrical operation minus the remote control connection and certain details of the same, the control member being shown just before it completes its movement in one direction.

The prime mover to be remotely controlled is indicated at 8 and is fluid pressure operated. While it may be of any suitable or desired type, it is herein shown as of the rotary type having a plurality of movable vanes 9 mounted for sliding movement in slots therefor in the rotor 10. The reversing valve 11 for motor 8 takes the form of a slide valve reciprocable in a chamber 12 provided by a valve box 8a which may form a part of the casing of the prime mover. Reversing valve 11 alternately places one of the ports 13 and 14 of the prime mover in communication with chamber 12 by sliding therebeyond while at the same time it brings the other port in communication with a port 15 leading to an exhaust chamber, the latter result being accomplished by a recess 11a in the lower portion of the valve. Pressure fluid for operating prime mover 8 is supplied by a conduit 16 which connects with a fluid pressure chamber 17 in valve box 8a, which chamber is separated by partitions from chamber 12. These partitions have opposed ports 18 and 18a which are controlled by inlet valves 19 and 19a of the poppet type having stems 20 and 20a projecting through suitable stuffing boxes beyond valve casing 8a. A coil spring 21 interposed between inlet valves 19 and 19a in chamber 17 yieldingly maintains both valves in closed position. Stems 20 and 20a of the inlet valves are in substantial parallelism with the oppositely projecting ends 22 and 22a of a rod which is secured to reversing valve 11 and which also projects through stuffing boxes beyond the valve box.

All of the above valves are arranged to be controlled by a single member 23. This member may take the form of a rod disposed intermediate the inlet valves and the reversing valve and in substantial parallelism with the same. It may extend through and be journalled in a bore 8b in the valve box as shown. Member 23 operates the valves through what may be termed a floating lever system. To this end member 23 has pivoted thereto on opposite sides of valve box 8a levers or links 24 and 25 which have loose pivotal connections at 24a and 25a with stems 22 and 22a respectively of reversing valve 11 and have their opposite ends in abutting relation with stems 20 and 20a of inlet valves 19 and 19a.

Figure 6:
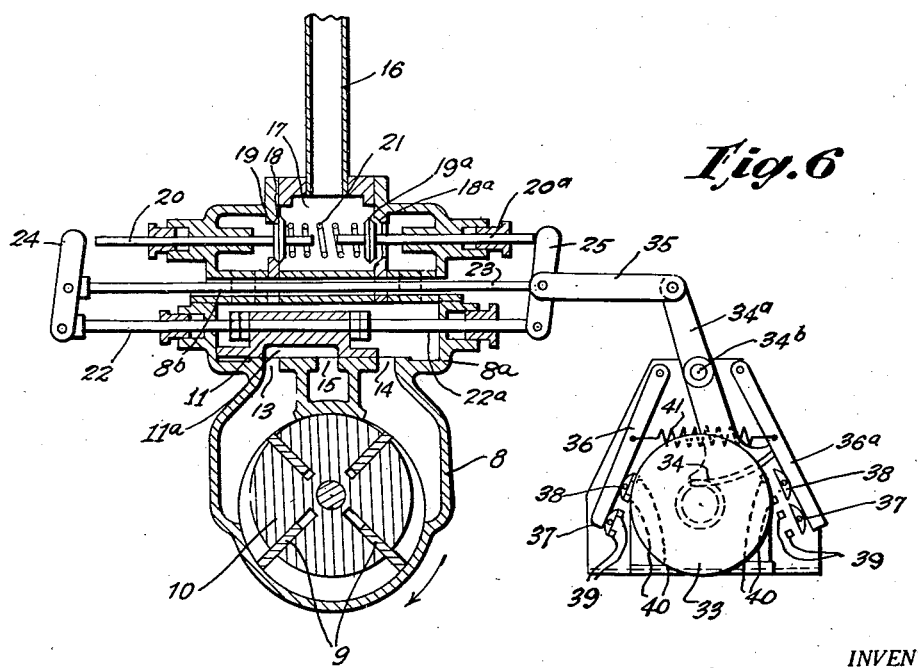
Fig. 6 is a diagrammatic sectional view of the parts shown in Fig. 5 but disclosing the control member at the limit of its movement.

If control member 23 is moved to the right, as indicated in Figs. 2 and 3, it will move levers or links 24 and 25 in the same direction. Spring 21, between the inlet valve heads, offers resistance to the movement of the free end of the levers 24. Reversing valve 11, however, is free to move, hence the links 24 and 25 take the angular position shown in Fig. 2 with the free ends fulcrumed on inlet valve stems 20 and 20a, thereby multiplying the movement imparted to reversing valve 11, the parts being so proportioned that valve 11 abuts the wall of the valve box when member 23 has accomplished about three-fourths of its movement. With the reversing valve in this position, prime mover 8 is ready for operation in the direction indicated by the arrow in Fig. 2. As control member 23 continues its movement to the right, levers or links 24 and 25 will now be fulcrumed on their pivots at the ends of reversing valve rods 22 and 22a since the reversing valve can move no further. This will swing lever 25 out of contact with stem 20a of inlet valve 19a but will cause lever 24 to force valve stem 20 inwardly overcoming spring 21 and opening inlet valve 19. Thereupon pressure fluid will pass from chamber 17 into chamber 12 and operate prime mover 8. The reverse movement of control member 23 will bring the position of the parts in succession to that shown in Figs. 2 and 1 and, if the movement is continued beyond the central position shown in Fig. 2, it will serve to put the reversing valve 11 in position for operation of prime mover 8 in a clockwise direction, as indicated in Fig. 5, and then cause the opening of inlet valve 19a, as indicated in Fig. 6, to admit motive fluid for putting the prime mover 8 in operation. Control member 23 may be moved manually or by power means and such movement may be effected from a point remote from the prime mover.

Figs. 1 to 3 inclusive disclose remote control means of the fluid pressure type. A branch connection 16a of restricted size leads from fluid conduit 16 to the remote control point. The remote control valve 26 is of the four-way type and conforms to that disclosed and claimed in my copending application Serial No. 468,048, filed July 15, 1930. It has an inlet port 27 connected with branch supply pipe 16a, opposed ports 28 and 29 for pipes 28a and 29a respectively, and a vent port 30. These ports are controlled by a plug 31 actuated by a handle 31a and having an arcuate passage 31b therethrough which is sealed when the plug is in neutral position (Fig. 1) but connects inlet port 27 with either port 28 or port 29 when the plug is moved 45° in either direction from the neutral position. Plug 31 also has a large passage 31c therethrough which interconnects ports 28 and 29 when the plug is in neutral position (Fig. 1) but serves to connect atmospheric exhaust port 30 with either port 28 or 29 when the plug has been moved to operating position. A small leak passage 31d is provided in plug 31 for establishing connection between passage 31c and atmospheric exhaust 30 when the control valve is in neutral position (Fig. 1). Pipes 28a and 29a lead to opposite ends of a cylinder of a small fluid pressure operating motor 32 having a piston 32a with a rod which in the present instance issues from motor 32a through a stuffing box and is secured upon or directly connected to operating member 23. In Figs. 2 and 3 handle 31a of remote control valve 26 has been moved counter-clockwise 45° thereby admitting pressure fluid from branch 26a to pipe 28a and to the left side of operating motor 32. Fig. 2 shows the position of the parts when piston 32 has moved approximately three-fourths of the distance from its central position shown in Fig. 1 while Fig. 3 shows the position of the parts when the piston has accomplished its full movement to the right.

Figs. 4, 5, and 6 show electrical means for effecting remote control of prime mover 8. In this instance fluid pressure supply pipe 16 for the prime mover 8 leads directly thereto and no branch connection of any kind is required. The electrical mechanism for moving and controlling the position of operating member 23 includes a motor 33 (Figs. 5 and 6) having the usual commercial spring set solenoid brake (not shown). Motor 33 drives a sector gear 34 on a lever arm 34a which is pivoted at 34b, the end of the lever arm being connected to operating member 23 through a link 35. In operative relation with the sector gear are pivoted arms 36 and 36a, each carrying bridging members 37, 38 for spaced pairs of contacts 39, 40 on the switch frame, the bridge members and contacts forming limit switches to cut out the motor and set its brake. Pivoted arms 36 and 36a are normally maintained with the bridge pieces engaging the contacts on the motor frame by a coil spring 41 connected to both arms.

The wiring diagram and diagrammatic showing (Fig. 4) indicates in broken outline a remotely located control board 42 having a triple pole, double throw switch indicated at A and a four pole push button switch B. The solenoid coil for releasing the spring pressed brake on motor 33 is diagrammatically indicated at C and the field for motor 33 at 33a. To operate the electrical control, switch A is thrown in the desired direction, such as to turn the armature shaft on motor 33 in a clock-wise direction so as to move control member 23 to the left from the neutral position indicated in Fig. 1. Since the limiting switches controlled by arms 36 and 36a are in contact, switch A directs current to the motor field 33a and the armature of motor 33 and also energizes solenoid C to release the motor brake. When sector arm 34a has moved approximately three-fourths of its distance, the parts will be in the position indicated in Fig. 5. As sector arm 34a reaches the limit of its movement, it contacts switch arm 36a (Fig. 6) moving the latter outwardly against the pull of spring 41 and breaking contact at switches 37, 39 and 38, 40 on that side. This stops motor 33 and also effects de-energizing of solenoid brake coil C so that the spring brake is immediately applied to motor 33 with the result that the parts are held in the position shown in Fig. 6. Prime mover 8 is now in operation in a clockwise direction, the reverse valve 11 being in the proper position and inlet valve 19a held open. In order to close the inlet valve and stop prime mover 8, switch A must be brought back to its central or neutral position. Then push button B is operated which energizes solenoid C of the brake to release the latter. Spring 21 between inlet valves 19 and 19a is then free to act to close the inlet and to drive motor 33 through control member 23, link 35 and sector arm 34a in the reverse direction until sector arm 34a allows switch arm 36a to be pulled back by spring 41 and close its switches 37, 39 and 38, 40. If reverse operation of prime mover 8 is then desired, switch A must be thrown in the opposite direction from that required for the previously described operation, whereupon the connections to the field and armature windings of motor 33 will be reversed.

Fig. 7 indicates a manually operated device for controlling the valves of prime mover 8 from a remote point. A link 35a, conforming in all respects to link 35 of Figs. 5 and 6, serves to connect the upright arm of a double arm bell crank 42 to operating member 23. Bell crank 42 may be pivoted at 43 and the horizontal arms may be connected by flexible members 44 and 45, such as cables or chains guided over suitably arranged pulley sheaves 46, to the horizontal arms of a double arm hand lever 47 which is pivoted at 48 to a suitable support. The operating handle 47a may be provided with a finger lever 49 operating a detent or catch 49a for cooperating engagement with notches therefor in a quadrant 50 by which the handle lever may be locked in any desired position of adjustment. The actuation of control member 23 may then be effected by hand lever 47a in an obvious manner. It may be used as a substitute control for the fluid pressure control arrangement disclosed in Figs. 1 to 3 inclusive and the electric control arrangement disclosed in Figs. 4 to 6 inclusive.

While the invention has been herein disclosed in a preferred construction and arrangement of valves for the prime mover and in certain alternative arrangements for remote control, it is to be understood that the invention is not limited to the specific details thereof but covers all changes, modifications, and adaptations within the scope of the appended claims.

I claim as my invention:

1. In combination, a reversible fluid pressure prime mover having a reversing valve and opposed inlet valves, a single spring disposed between said inlet valves and acting upon both said inlet valves normally to maintain the same in closed position, and a control member movable in two directions and arranged to set the reversing valve and thereafter to force open one or the other of said inlet valves against the action of said spring.

2. In combination, a reversible fluid pressure prime mover having a reversing valve and opposed spring-pressed inlet valves, and a control member for all said valves having means providing a floating lever connection therewith whereby on movement of said member said reversing valve is first adjusted and thereafter forms a fulcrum through which said lever connection operates to open one of said inlet valves.

3. In combination, a reversible fluid pressure prime mover having a reversing valve and opposed inlet valves, a spring engaging both said inlet valves yieldingly to maintain the same in closed position, and a single control member having means providing a floating lever connection with said valves and arranged to change the fulcrum of the same during movement of said control member in one direction thereby to operate first said reversing valve and thereafter one of said inlet valves.

4. In combination, a fluid pressure prime mover having a valve box providing a chamber and ports leading to said prime mover and to exhaust opening into said chamber, a reversing valve of the slide type reciprocable in said chamber for controlling said ports, opposed inlet valves of the poppet type controlling the admission of pressure fluid to said chamber and disposed in substantial parallelism with said reversing valve, and a single operating member for said valves having spaced pivoted transverse members loosely pivoted to said opposite sides of said reversing valve and abutting the ends of said inlet valves whereby on movement of said member said reversing valve is first moved to proper position and then one of said inlet valves is opened.

5. In combination, a fluid pressure prime mover having a valve box providing a chamber and ports leading to said prime mover and to exhaust opening into said chamber, a reversing valve of the slide type reciprocable in said chamber for controlling said ports, opposed inlet valves of the poppet type controlling the admission of pressure fluid to said chamber and disposed in substantial parallelism with said reversing valve, resilient means engaging both said inlet valves yieldingly to maintain the same in closed position, and a single operating member for said valves having spaced pivoted transverse members loosely pivoted to opposite sides of said reversing valve and abutting the ends of said inlet valves whereby on movement of said member said reversing valve is first moved to proper position and then one of said inlet valves is opened.

6. In combination, a fluid pressure prime mover having a valve box providing a chamber and ports leading to said prime mover and to exhaust opening into said chamber, a reversing valve of the slide type reciprocable in said chamber for controlling said ports, opposed inlet valves of the poppet type controlling the admission of pressure fluid to said chamber and disposed in substantial parallelism with said reversing valve, a single coil spring engaging the heads of both said inlet valves yieldingly to maintain the same in closed position, and a single operating member for said valves having a floating lever connection with the same comprising spaced pivoted transverse members loosely pivoted at one end to opposite sides of said reversing valve and abutting with the other end the ends of said inlet valves whereby on movement of said member said reversing valve is first moved to proper position and then one of said inlet valves is opened.

7. In combination, a fluid pressure prime mover having a valve box, a reversing valve and an inlet valve disposed in parallel juxtaposition in said box, a single operating member for both said valves mounted for reciprocating movement intermediate said valves and having a bearing in said box, and an actuating lever pivoted to said member and to one of said valves and having abutting contact with the other valve.

8. In combination, a fluid pressure prime mover having a valve box providing a chamber and ports leading to said prime mover and to exhaust opening into said chamber, a reversing valve in said chamber for controlling said ports, a plurality of inlet valves for controlling admission of pressure fluid to said chamber, and means including a single operating member for actuating all said valves extending through said box and having floating lever connections with said valves on opposite sides of said box.

FRANKLIN E. TERRILL.